United States Patent [19]
Bierwith

[11] Patent Number: 6,032,390
[45] Date of Patent: Mar. 7, 2000

[54] TOOTH ASSEMBLY FOR EXCAVATION BUCKET

[76] Inventor: Robert Bierwith, 1331 Eastshore Hwy., Berkeley, Calif. 94710

[21] Appl. No.: 08/486,116

[22] Filed: Jun. 7, 1995

[51] Int. Cl.[7] .................................................. E02F 9/28
[52] U.S. Cl. .............................. 37/456; 37/450; 37/452; 403/374.1; 403/318; 403/298; 403/379.4
[58] Field of Search .............................. 37/446, 447, 448, 37/449, 450, 451, 452, 453, 454, 455, 456; 403/379, 374, 316, 318, 298, 374.1, 379.4

[56] References Cited

U.S. PATENT DOCUMENTS

| | | | |
|---|---|---|---|
| 1,584,851 | 5/1926 | Crone | 37/455 X |
| 3,736,664 | 6/1973 | Black et al. | 37/446 |
| 3,967,398 | 7/1976 | Stepe | 37/448 |
| 4,071,967 | 2/1978 | Klett | 37/448 |
| 4,360,981 | 11/1982 | Bierwith et al. | 37/141 T |
| 4,413,432 | 11/1983 | Bierwith et al. | 37/142 A |
| 4,414,764 | 11/1983 | Johansson et al. | 37/450 |
| 4,570,365 | 2/1986 | Bierwith | 37/141 T |
| 4,579,494 | 4/1986 | Bierwith | 411/512 |
| 4,625,437 | 12/1986 | Curtis et al. | 37/451 |
| 4,872,274 | 10/1989 | Giersch et al. | 37/450 X |
| 5,052,134 | 10/1991 | Bierwith | 37/450 X |
| 5,063,696 | 11/1991 | Smith | 37/446 X |
| 5,068,986 | 12/1991 | Jones | 37/446 X |
| 5,134,793 | 8/1992 | Bierwith | 37/142 A |
| 5,272,824 | 12/1993 | Cornelius | 37/458 |
| 5,325,615 | 7/1994 | Hutchins et al. | 37/455 |
| 5,333,696 | 8/1994 | Cornelius | 37/449 X |
| 5,417,518 | 5/1995 | Bierwith | 403/374 |
| 5,435,084 | 7/1995 | Immel | 37/398 |
| 5,438,774 | 8/1995 | Fletcher et al. | 37/455 X |

*Primary Examiner*—Victor Batson
*Attorney, Agent, or Firm*—Townsend and Townsend and Crew

[57] ABSTRACT

In an excavation bucket, the nose of an adapter has two surfaces to take the horizontal loads and four surfaces to take the vertical loads. A pin holds and locks a tooth to the adapter. Projections on the pin engage sloping surfaces of the nose. A recess placed ahead of the nose of the adapter will become visible as the tooth erodes due to wear. A recess at the nose of the adapter indicates that the tooth has worn too much and, unless the tooth is replaced, will commence to cause wear of the adapter and adjacent parts. To attach the adapter to the lip of the excavation bucket, wedge members are joined together near one end thereof to form a wedge-shaped block insertable into a wedge-shaped space formed by a C-clamp surface and a slot in the lip. The block is forced into the space, and spring biased teeth carried by the lock box progressively enter and leave the recesses in the outer surface of the C-clamp. When the C-clamp is tight enough in the gap, the installation of the lock box is complete. The lock box can be subjected to hammer blows so as to shear the bolt or cap screw so that the lock box can be removed from its operative position in the gap. Thus, the lock box can be used over and over again.

5 Claims, 9 Drawing Sheets

TOOTH ASSEMBLY FOR EXCAVATION BUCKET

This invention relates to improvements in the way in which digging loads on the teeth of excavating buckets are transferred to the nose of the adapter. This design also allows the tooth to be completely worn out without damaging the nose or affecting the fit.

Secondly, this invention relates to an improved pin for holding and locking the tooth to the nose of the adapter. The pin works well when the adapter is new and also when the load carrying surfaces of the nose have been worn or "brinnelled", allowing the tooth to move back.

Thirdly, this invention relates to an improved method for connecting and locking a tooth adapter to the lip of an excavating bucket. This connecting and locking mechanism has improved features over the Bierwith patent 4,579,494 and will be described hereinafter.

SUMMARY OF THE INVENTION

In the present invention relating to the way in which the digging loads on the teeth are transferred to the nose of the adapter, the nose has dual contact areas for horizontal loads which are located roughly midway between the four contact areas for vertical loads. This ensures that there is always adequate surface area in a location to take any digging loads, i.e., horizontal, vertical or a combination of both, without overstressing either the nose or the tooth. This midpoint location of the horizontal load contact areas also allows a recess in the front of the tooth pocket which allows the tooth to wear back farther, allowing it to "hole out" without damaging the load contact areas of the adapter nose.

Figure 9:
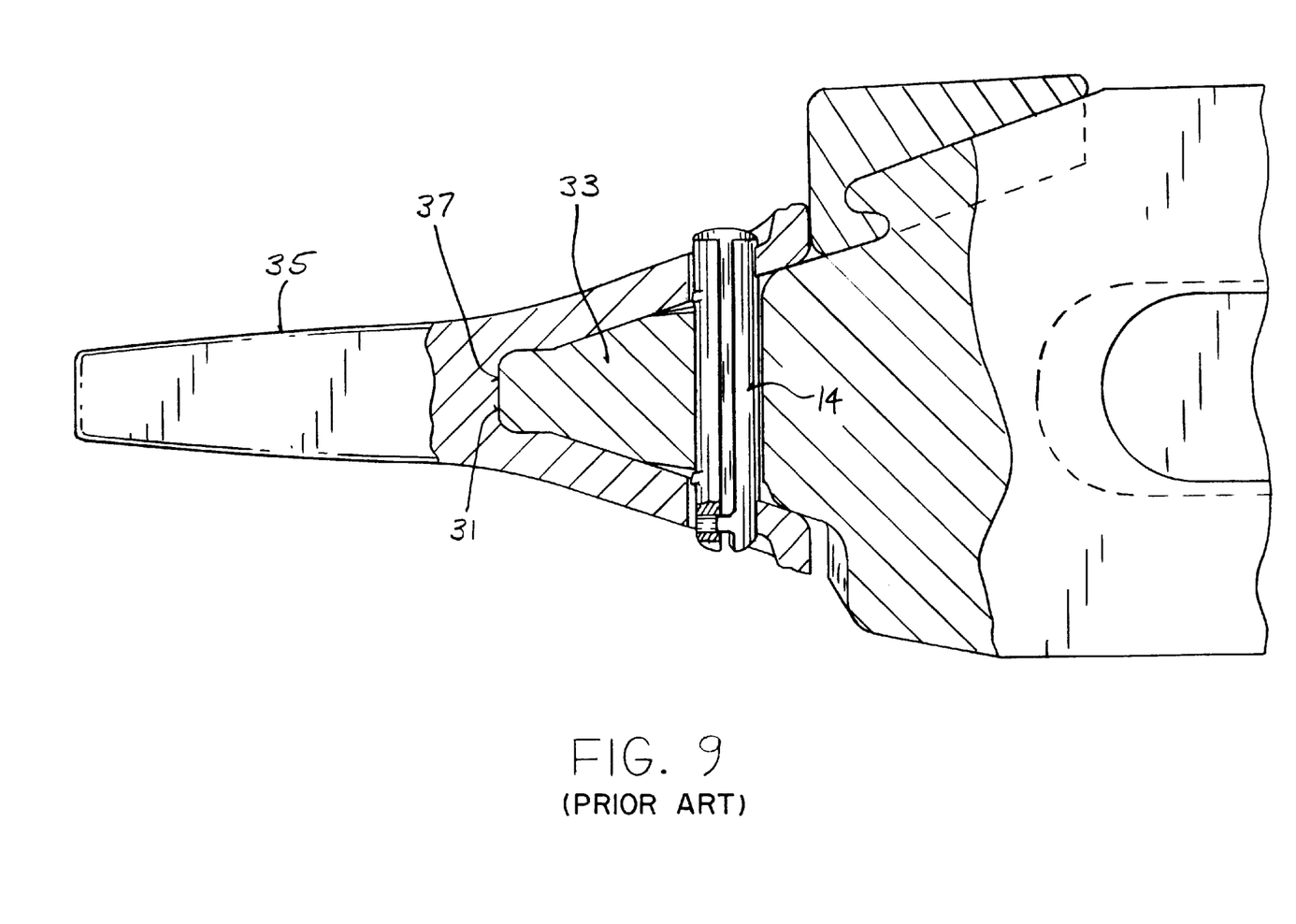
FIG. 9 is a view of the tooth on the nose of conventional adapter.
Figure 10:
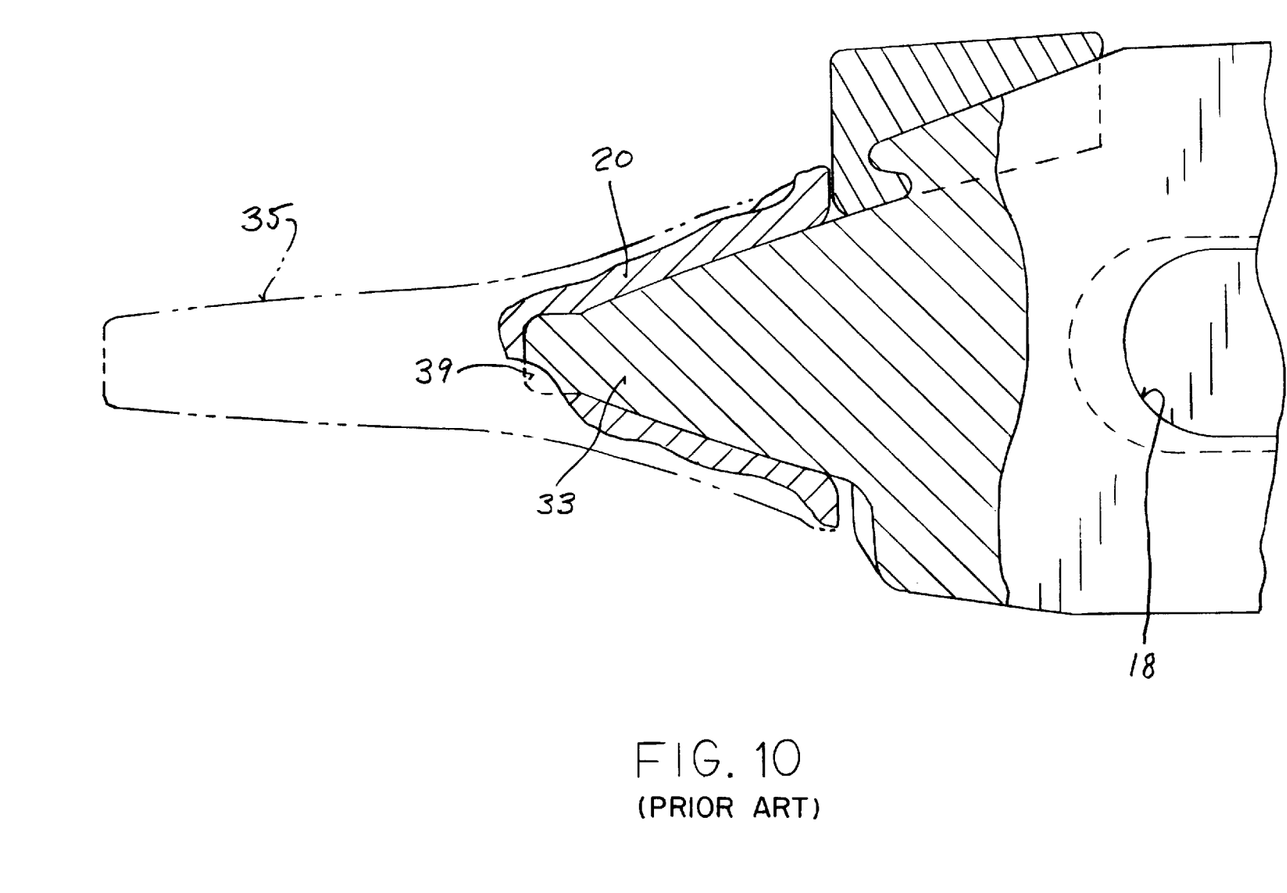
FIG. 10 is a view similar to FIG. 8 but showing a worn tooth and the resulting wear on the nose of a conventional adapter.

A conventional nose design is shown in FIG. 9 wherein the horizontal load is taken on the end 31 of the adapter 33 so that the tooth 35 is in direct contact at 39 with the adapter. As can be seen in FIG. 10, when a tooth has worn back to where pocket 39 is visible, the load bearing surface of the nose has worn away, reducing the load bearing area which can cause early tooth failure.

As to the aspect of the invention relating to the holding and locking of the tooth to the adapter, the keeper pin is made of two identical steel halves bonded together with an elastomer. These steel halves have raised projections close to each end that lock the pin in place once it has been driven into place. Since the two halves are identical, the pin cannot be driven in wrong and is also cheaper to manufacture. The surfaces of the nose where the pin hole is located are sloped to allow for easier removal. This feature will be described further hereinafter.

As to the third aspect of the invention relating to the improved method for connecting and locking the adapter to the lip of an excavating bucket, a new lock box arrangement is provided. To this end, the lock box is comprised of a pair of initially separable wedge members which are joined together near one end thereof to form a wedge-shaped block insertable into a wedge-shaped space or gap formed by the C-clamp and the front end of a slot in the lip of the excavating bucket. The block is forced in the space and small, spring biased teeth carried by the lock box progressively enter and leave the recesses in the outer surface of the C-clamp. When the C-clamp is tight enough in the gap, the installation of the lock box is complete. However, the lock box can be subject to hammer blows so as to sever or shear the bolt or cap screw so that the lock box itself can be removed from its operative position in the gap. Thus, the lock box can be used over and over again to minimize costs.

A further object of the present invention is to provide an improved connector lock box assembly which is comprised of wedge members interconnected by a shear pin so that the members can be put into place as a unit to fill the space to thereby simplify tooth adapter replacement.

DETAILED DESCRIPTION OF THE PREFERRED EMBODIMENT

Figure 1:
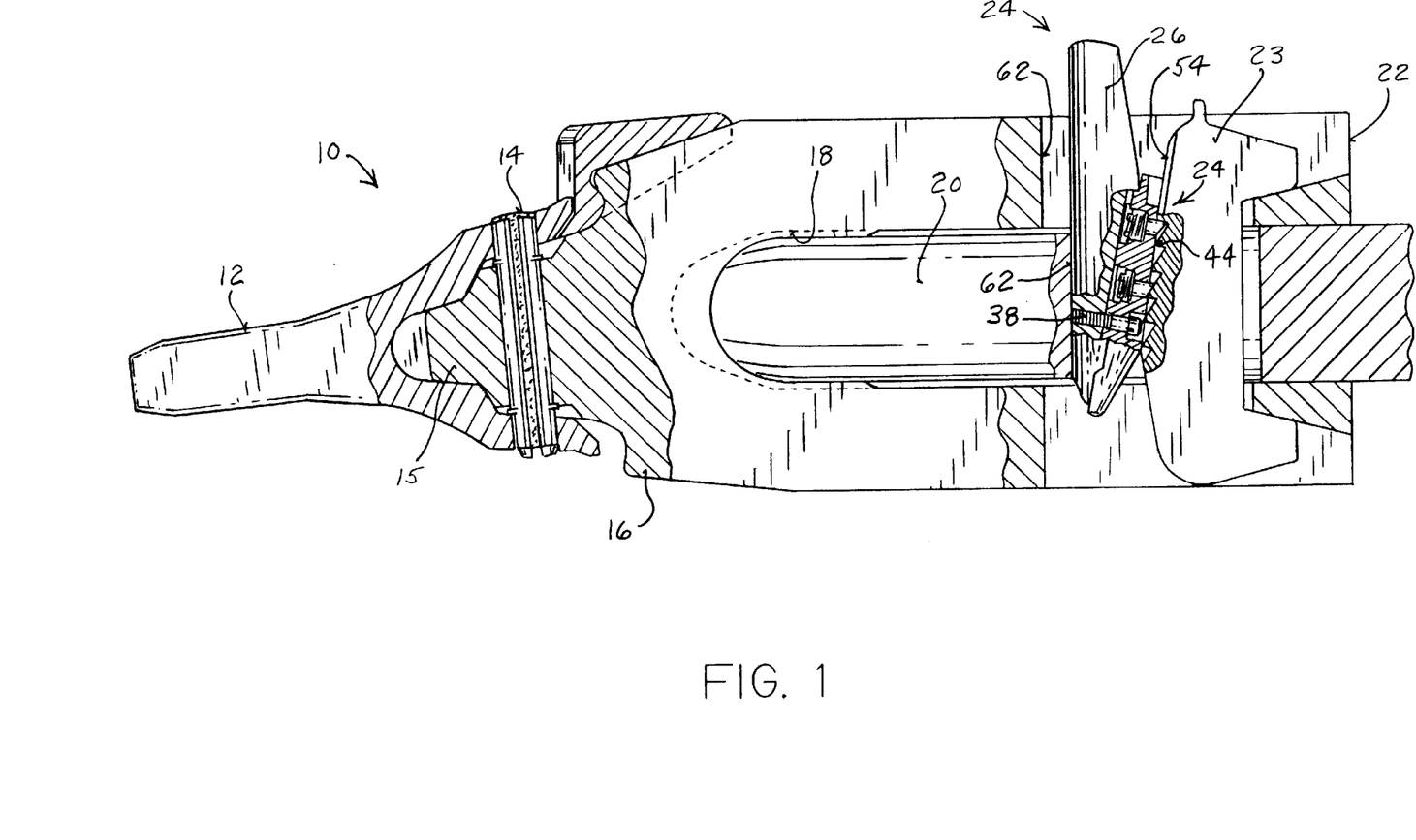
FIG. 1 is a side elevational view, partly in section, of an excavation tooth assembly coupled to the lip of an excavation bucket.

The excavation tooth assembly of FIG. 1 is broadly denoted by the numeral 10 and includes an excavation tooth 12 mounted by a pin 14 on the front end 15 of an adapter 16. The adapter has a slot 18 for receiving the lip 20 of an excavation bucket. All of the foregoing elements are basically conventional except for the improvements outlined in this invention and described hereinafter.

Figure 7:
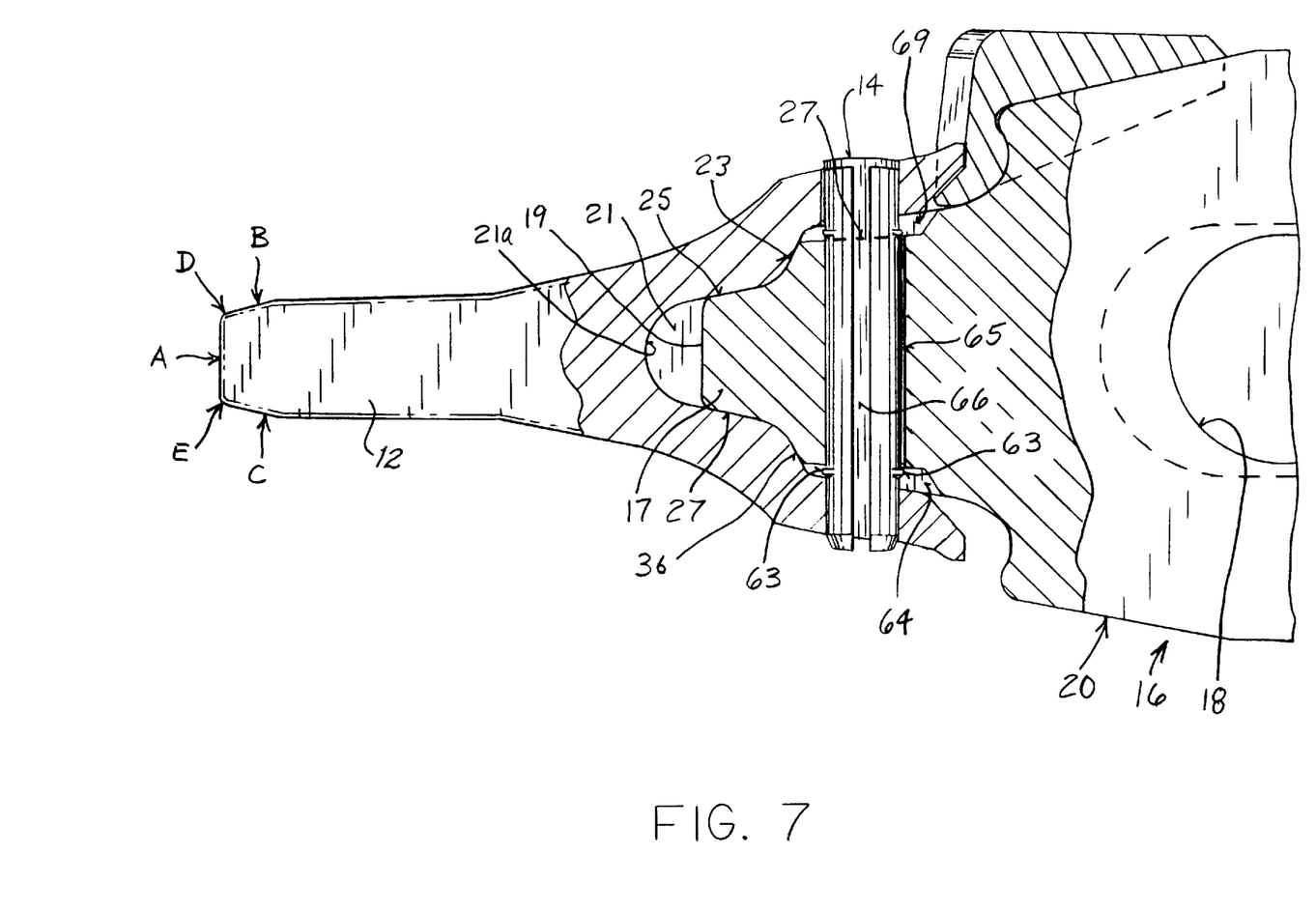
FIG. 7 is a side elevational view of the improved adapter of the improved tooth and adapter combination.

The first aspect of the present invention is shown in FIGS. 1 and 7 and relates to the way in which the load on the tooth is transferred to the nose of the adapter. When the load is horizontal (denoted by arrow A in FIG. 7) it is taken entirely on the two surfaces 23. When the load is vertical, denoted by arrow B, the force is taken on the top surface 25 and the lower surface 27. Arrow C load is taken on the lower surface 25 and the upper surface 27. Combination loads (arrows D and E) use all three surfaces to a varying degree depending on the angle of the load.

Reference is made to FIG. 7 which shows the front surface 19 of the nose spaced rearwardly from the curved recess 21 of the tooth pocket. This design allows the tooth to wear back farther allowing it to "hole out" without damaging the load bearing area of the adapter nose. See FIG. 8.

Figure 11A:
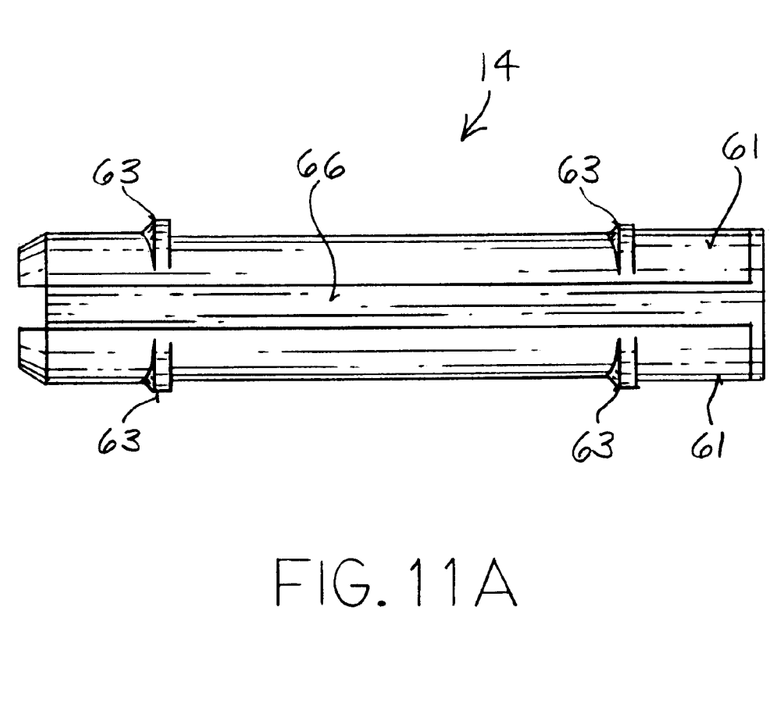
FIGS. 11A and 11B are side and end views respectively of the tooth keeper pin.
Figure 11B:
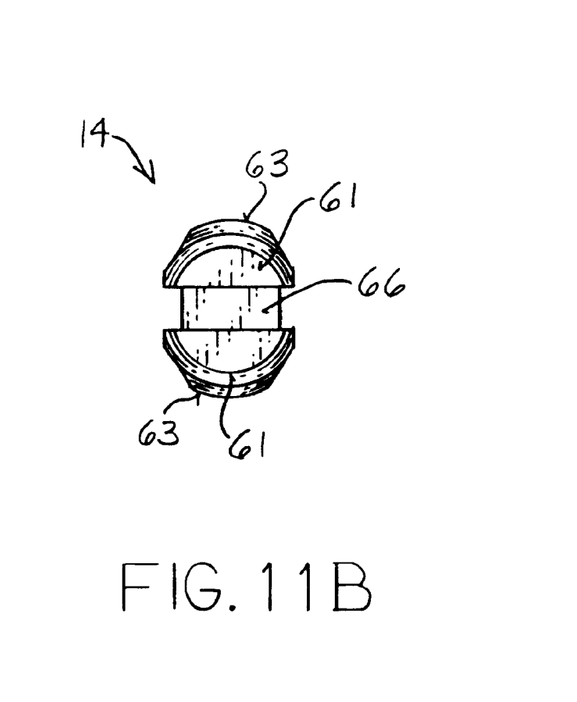

The second aspect of this invention, which relates to an improved pin for holding and locking the tooth to the nose of the adapter, is shown in FIG. 7. and detailed in FIGS. 11A and 11B.

As can be seen in FIG. 11A, the pin 14 is made up of two identical steel semi-circular halves 61 bonded together by an elastomer 66. The steel halves have projections 63 near both ends. These projections lock the pin in place once it has been installed.

As shown in FIG. 7, the top and bottom surfaces 64, 69 of the adapter nose where the pin hole is located are slanting forward. This allows the rearward projections 63 of pin 14 to contact surfaces 64, 69 and the forward projections to be slightly removed from these surfaces. When the pin is driven downward to remove it, the rearward projections enter the hole first compressing the elastomer 66. As the pin is driven further downward, the forward projections enter the hole, further compressing the elastomer. This makes removal of the pin much easier than if both forward and rearward projections enter the hole at the same time, and does not diminish the locking ability of the pin.

As can be seen in FIG. 7, when the tooth and adapter are new, there is a gap 65 between the pin 14 and the hole in the adapter. Thus, the rearward projections 63 have less interference on the hole, but since the elastomer 66 is compressed more, the locking ability is not diminished. As the parts wear and the gap is diminished the elastomer is compressed less, but the projection has more interference on the hole so that the locking ability remains unchanged.

Figure 1A:
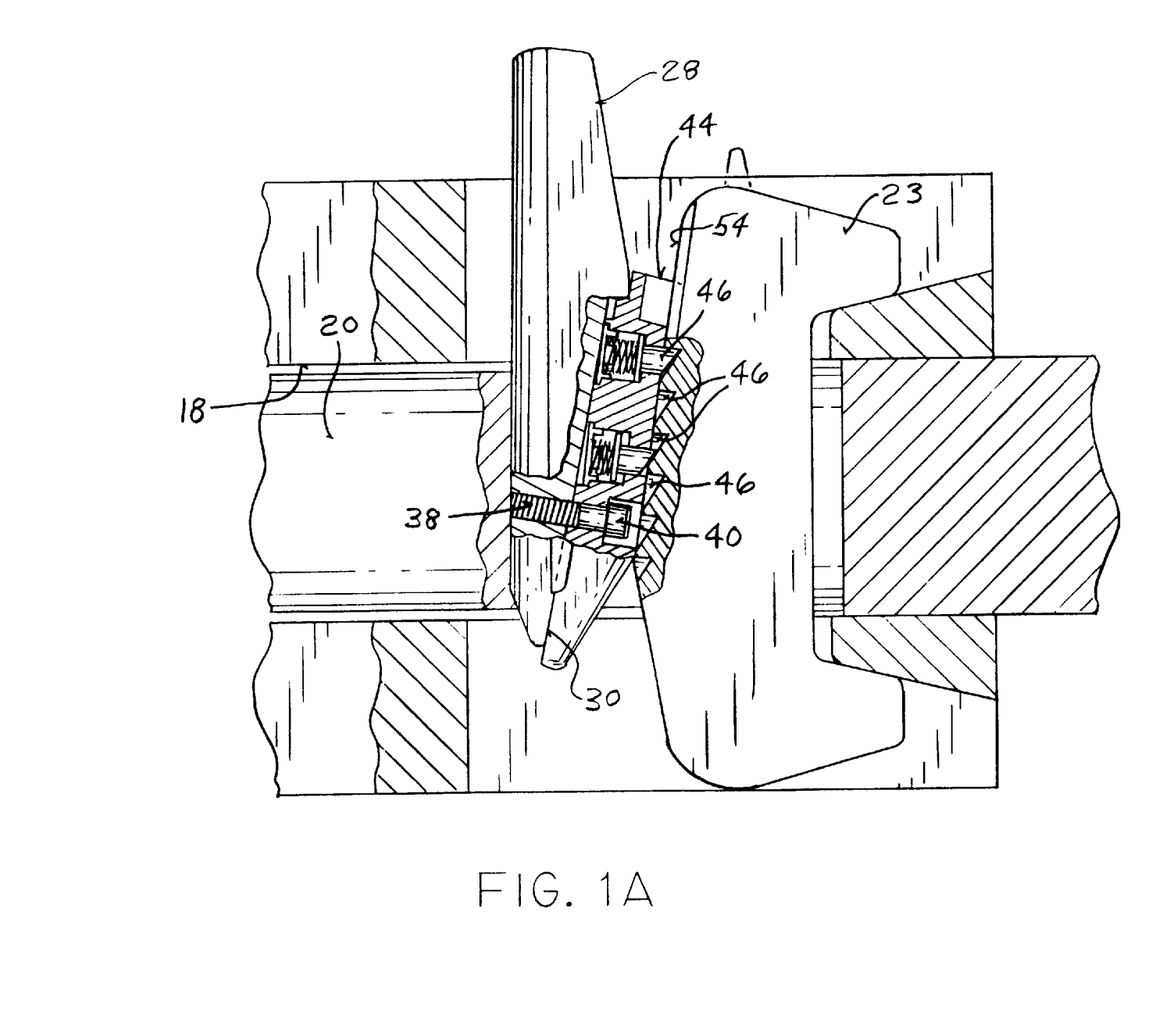
FIG. 1A is a vertical section through a lock box for coupling the adapter of the tooth assembly to the lip of an excavation bucket.
Figures 2, 3, 4, 5:
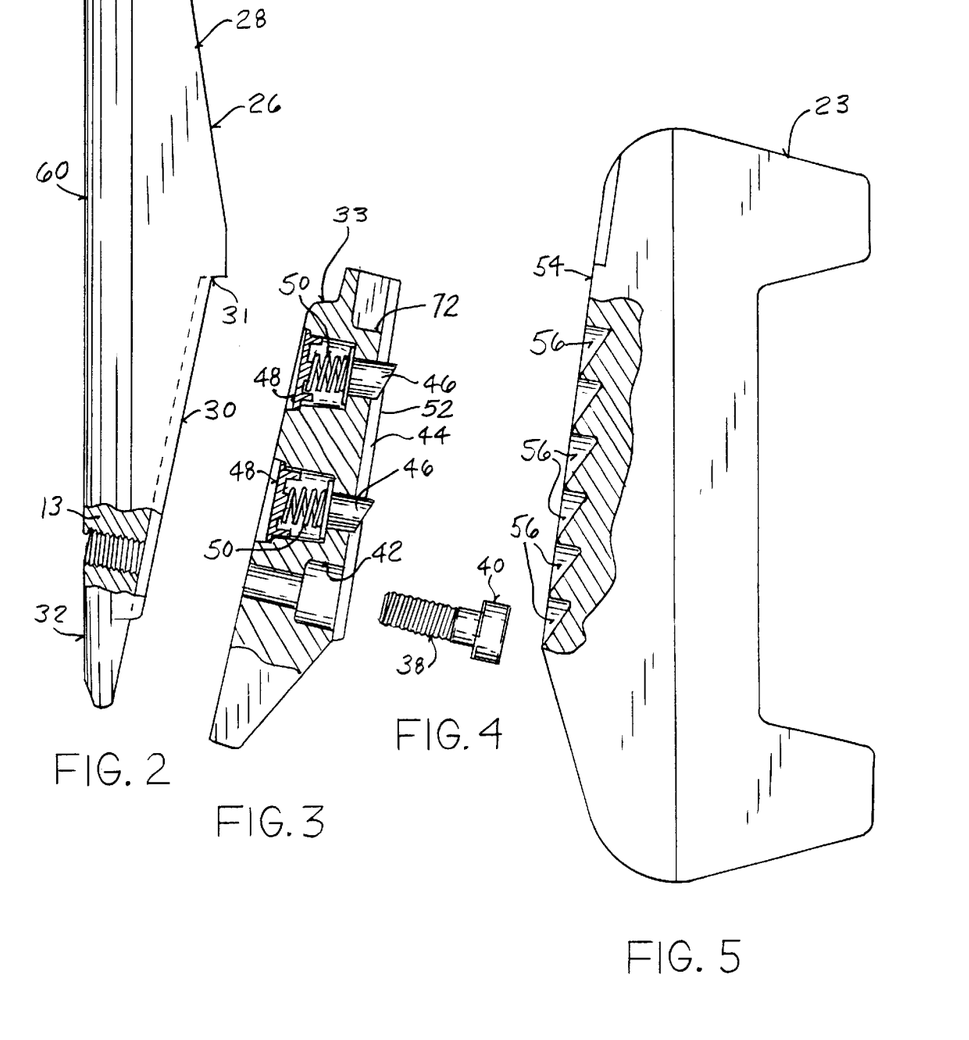
FIG. 2 is an elevational view of one side of a wedge member forming a part of the locking means of FIG. 1A.
FIGS. 3, 4 and 5 are elevational views of other parts of the locking means of FIG. 1A.

The third aspect of this invention relates to an improved method for connecting and locking an adapter 16 to the lip 20 of an excavating bucket as shown in FIG. 1A.

The parts of this mounting means are shown in FIGS. 2, 3, 4, and 5 in an exploded view and are shown in FIG. 1A assembled in working position. This mounting means includes a wedge 26 having two inclined surfaces 28 and 30 which converge toward each other as they approach a projection or shoulder 31. This shoulder 31 is a surface which projects transversely of the inclined surface 30.

The lower end 32 of wedge 26 has a threaded bore 13 therethrough for threadably receiving a cap screw 38 having a head 40. The cap screw normally passes through a hole or a bore 42 near the lower end of a lock box member 44 forming a part of the mounting means.

Lock box member 44 has a number of projections 46 which are shiftably mounted in bores 48, there being a spring 50 in each bore 48 for biasing the projection 46 outwardly past an inclined surface 52 of lock box member 44 which is adapted to mate with a surface 54 of C-shaped clamp 23. Surface 54 has a number of wedge-shaped recesses 56 past which projections 46 move so that the lock box 44 can be coupled to the C-shaped clamp 23 as wedge 26 and lock box 44 are moved into place.

In use, the wedge 26 has a flat surface 60 for engaging the adjacent surface 62 FIG. 1 of the lip 20. Before this occurs, cap screw 38 will have been threadably mounted in bore 13 (FIG. 2) to releasably interconnect wedge 26 and lock or wedge member 44. The shoulder 31 will engage the shoulder 33 of the lock box in the manner shown in FIG. 1A.

With C-shaped clamp 23 in place, the gap between surface 62 (FIG. 1) and surface 54 is left open for receiving the combination of wedge 26 and wedge 44. Installation of the combination of wedge 26 and wedge 44 easy and is quick to accomplish since the wedge and the lock box are bolted together by the cap screw to make a wedge assembly comprised of the two components, namely wedge 26 and wedge 44.

As the wedge 26 is driven downwardly, the mating shoulders 30 and 31 on the wedge and the lock box carry the lock assembly made up of wedge 26 and member 44 downwardly with it. The spring loaded projections or teeth 46 alternately go into and out of the serrations or recesses 56 (FIG. 5) on the front of the C-clamp until the wedge assembly is tight.

Wedge 26 and C-clamp 23 are wearable parts and may need to be replaced each time a tooth adapter 14 is replaced. Member 44 with the springs 50 and the teeth 46 installed therein are not subject to wear. They can be used repeatedly. They are reused by bolting with a new cap screw 38 to a new wedge 26.

Figure 6:
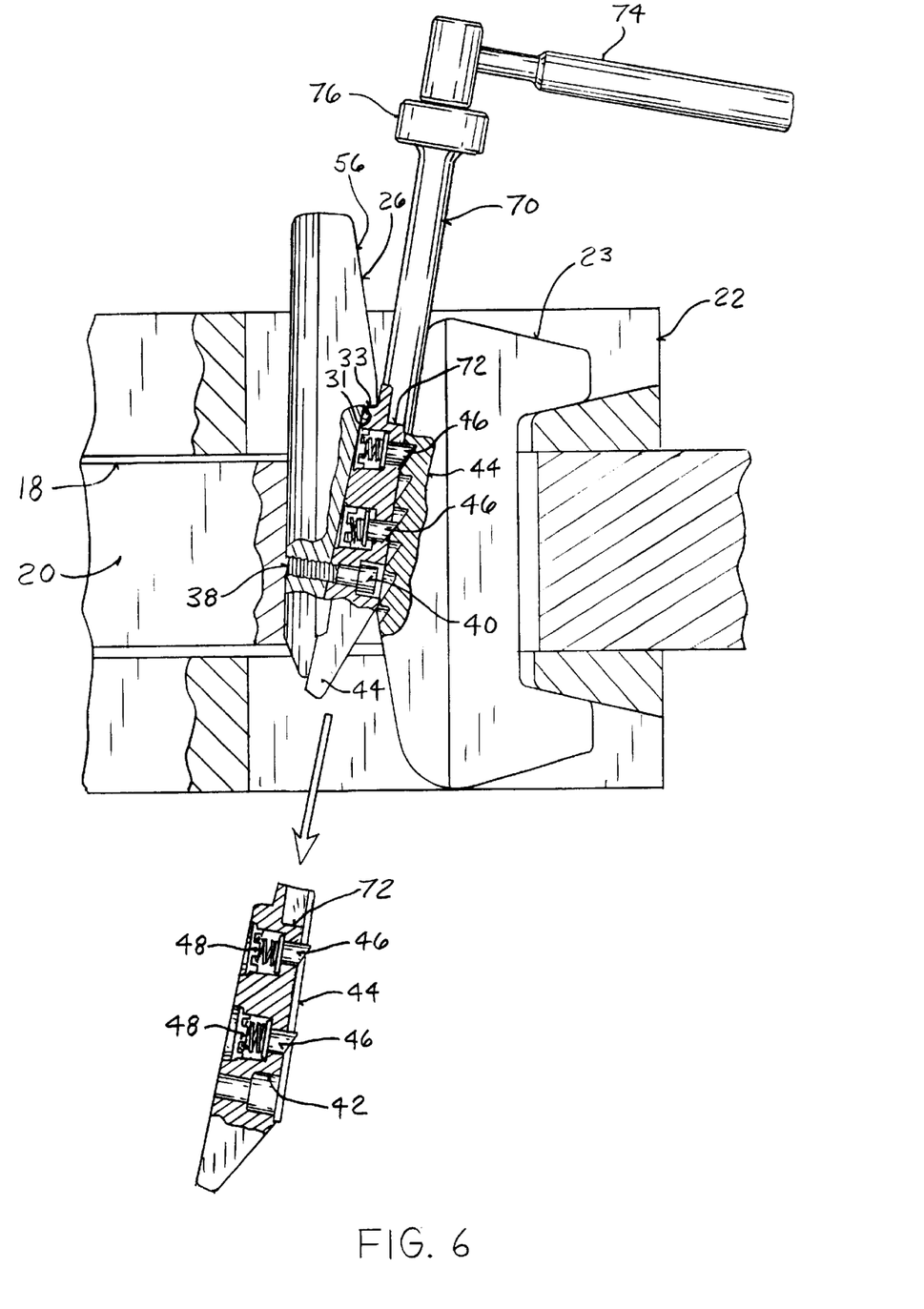
FIG. 6 is a view similar to FIG. 1A, but showing the way in which the wedge member of the locking means of FIG. 1A is separated to allow replacement of the adapter.

When it is desired to separate the lock box assembly from connection with the C-clamp, a removable tool 70 is placed against one end on surface 72 (FIG. 3) and a hammer 74 strikes a boss 76 to force the lock box 44 downwardly as shown in FIG. 6. This causes the cap screw to be sheared off, allowing the lock box assembly to fall through to the ground. This allows the wedge 26 and C-clamp 23 to fall through also. The worn tooth adapter 16 can then be removed and replaced with a new one. All operations are done from the top, making it safer and easier to accomplish.

Another aspect of the present invention is shown in FIGS. 1 and 7 and relates to the way in which the load on the teeth of an excavating bucket is transferred to the nose of the tooth adapter. This design allows the tooth to wear back farther, allowing it to hole out without damaging the load bearing area of the tooth adapter nose.

Reference is made to FIG. 7 which shows tooth 12 coupled by pin 14 to the front end 19 of the adapter 16. The front surface 19 of the front end 19 is spaced rearwardly from the major portion of the curved recess 21 in the rear end of the tooth.

Figure 8:
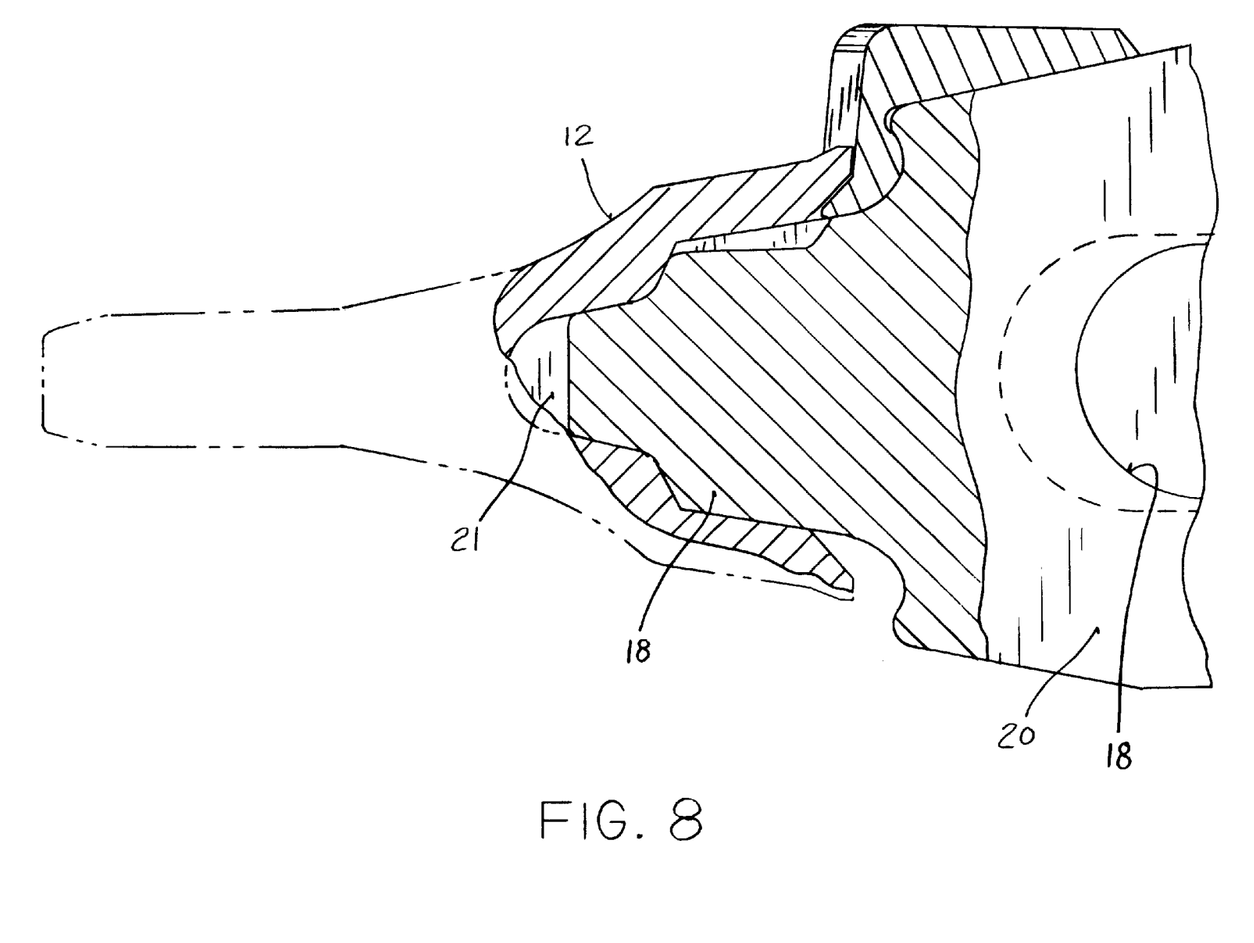
FIG. 8 is a view similar to FIG. 7 but showing a worn tooth on the improved tooth and adapter combination.

Surface 23 of the adapter (FIG. 7) takes on the horizontal loads exerted by the tooth so that no loads are exerted on the front face 19 of the adapter. Vertical loads are taken on surfaces 25 and 27. FIG. 8 shows how the tooth can wear back until the pocket 29 is visible, indicating time for replacement without damaging any of the other surfaces.

A conventional nose design is shown in FIG. 8 wherein the horizontal load is taken on the end 31 of the adapter so that the tooth is in direct contact with the adapter. As can be seen in FIG. 10, when a tooth has worn back to where the pocket is visible, the load bearing surface of the nose has worn away, reducing the load bearing area, which can cause early tooth failure.

I claim:

1. A wedge assembly for placement into a tapered hole for securing a tooth adapter to an excavation bucket with a C-clamp, the adapter, the bucket and the C-clamp forming a through hole including a tapered section which is angularly inclined relative to an axis of the hole, the wedge assembly comprising:

an elongated main body having longitudinal first and second end sections and a midsection therebetween, the midsection having a transverse extent greater than a transverse extent of the end sections, and a face which is angularly inclined relative to a longitudinal extent of the body, extends over the first end section and at least a portion of the midsection, and terminates in the midsection at a shoulder oriented transversely to the longitudinal extent of the body and facing towards the first end section;

a lock member in surface contact with the face, engaging the shoulder, and having a wedging surface for engaging the tapered section of the through hole, the lock member extending from the body in a transverse direction past the transverse extent of the midsection of the body and defining an impact surface in a vicinity of the shoulder which generally faces towards the second end; and a shear member securing the lock member to the body so that the lock member engages the face and the shoulder of the body, the shear member being formed so that it can be sheared off to permit the separation of the lock member from the body when the wedge assembly is disposed in the hole by applying a force to the impact surface of the lock member in a direction towards the first end section.

2. A wedge assembly according to claim 1 wherein the shear member comprises a threaded bolt.

3. A wedge assembly according to claim 1 wherein the tapered hole section defines a plurality of indentations spaced apart in the axial direction of the hole, and wherein the lock member includes at least one movable projection formed to extend into the indentations, and means biasing the projection into the indentations.

4. A wedge assembly for securing an adapter to a lip of an excavation bucket with a C-clamp, overlapping portions of the adapter and the lip defining a through hole for receipt of the wedge assembly, the C-clamp being disposed in the through hole and having a generally axially oriented, tapered surface facing the through hole so that the wedge assembly engages the tapered surface, the wedge assembly comprising:

an axially elongated body having spaced-apart first and second ends, a first side which extends along a substantially straight line between the ends and a second, opposite side defined by first and second faces which extend from an intermediate point along a length of the body and convergingly relative to the first side towards the first and second ends, respectively, of the body;

a lock member having spaced-apart opposite surfaces, one of the opposite surfaces engaging the first face and the other one of the opposite surfaces for engaging the tapered surface of the C-clamp when the wedge assembly is placed into the hole;

shearable means securing the lock member to the body and traversing an interface between them defined by the first face of the body and the one of the opposite surfaces of the lock member;

means independent of the shearable means securing the body and the lock member against relative movements along the interface when the wedge assembly is disposed in the hole and an axially oriented force is applied to the second end of the body to thereby lock the adapter, the lip assembly and the C-clamp to each other; and an impact surface defined by the lock member facing towards the second end and reachable with an impact tool extending into the through hole for applying a generally axial force to the lock member when the wedge assembly is disposed in the tapered hole section;

whereby, upon the application of an axial force to the impact surface, the shear member is sheared off, and the lock member is driven relative to the body along the interface towards the first end of the body for separating the lock member from the body, removing the wedge assembly from the through hole, and, thereafter, disassembling the C-clamp, the adapter and the lip.

5. A wedge assembly according to claim 4 wherein the means independent of the shearable means comprises a shoulder and a ledge cooperating with the shoulder defined by the body and the lock member.

* * * * *